United States Patent Office 3,061,640
Patented Oct. 30, 1962

3,061,640
3,4-DICHLOROPHENYL DIALKYLAMINOALKYL UREAS AND THIOUREAS
David J. Beaver, Richmond Heights, and Paul J. Stoffel, St. Louis, Mo., assignors to Monsanto Chemical Company, St. Louis, Mo., a corporation of Delaware
No Drawing. Filed Mar. 30, 1959, Ser. No. 802,656
8 Claims. (Cl. 260—552)

This invention relates to a new class of chemical compounds and to a method of preparing the same. More particularly this invention relates to compounds of the structure

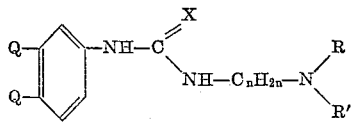

where Q is a member selected from the group consisting of bromine and chlorine, X is a member selected from the group consisting of oxygen and sulfur, $n$ is an integer from 1 to 3, R is an alkyl radical having from 1 to 8 carbon atoms, and R' is an alkyl radical having from 1 to 8 carbon atoms.

The new compounds of this invention are useful as bacteriostats and may be prepared by reacting 3,4-dihalophenylisocyanate or the corresponding 3,4-dihalophenylisothiocyanate with a N,N-dialkylalkylenediamine of the structure

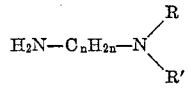

where $n$ is an integer from 1 to 3, R is an alkyl radical having from 1 to 8 carbon atoms, and R' is an alkyl radical having from 1 to 8 carbon atoms. The reaction of the isocyanate with the diamine takes place readily at room temperature and usually it is found desirable to use some diluent like ether, benzene, or petroleum ether to control the exothermic reaction that occurs. Where the isothiocyanate is used, the reaction takes place more slowly and may be maintained at the reflux temperature of the system where ether is the solvent used. The temperature of the reaction may as a result vary considerably, e.g., from room temperature to the reflux temperature of the system depending upon the particular reactants and the solvent or diluent used.

As illustrative of the preparation of the new compounds are the following:

EXAMPLE I 1-(3,4-Dichlorophenyl)-3-(2-Diethylaminoethyl) Urea

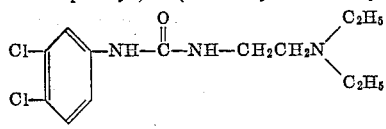

A solution of 18.8 g. (0.1 mole) of 3,4-dichlorophenylisocyanate in 50 ml. of ether is combined with 11.6 g. (0.1 mole) of N,N-diethylethylenediamine in 50 ml. of ether which results in a vigorous exothermic reaction setting in at once. After stirring two hours, the ether is removed under vacuum leaving 1-(3,4-dichlorophenyl)-3-(2-diethylaminoethyl) urea as a viscous yellow oil. Yield: 95.0% of theory. Analysis: calculated for Cl—23.32%; found 23.27%.

EXAMPLE II 1-(3,4-Dibromophenyl)-3-(2-Diethylaminoethyl) Urea

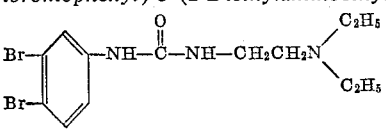

The procedure of Example I is repeated except that 27.7 g. (0.1 mole) of 3,4-dibromophenylisocyanate is used in place of the 3,4-dichlorophenylisocyanate and 1-(3,4-dibromophenyl)-3-(2-diethylaminoethyl) urea is obtained in good yield.

EXAMPLE III 1-(3,4-Dichlorophenyl)-3-(3-Diethylaminopropyl) Urea

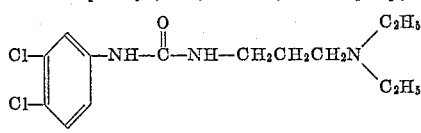

The procedure of Example I is repeated except 13.0 g. (0.1 mole) of N,N-diethylpropylenediamine are used and 1-(3,4-dichlorophenyl)-3-(3-diethylaminopropyl) urea is obtained as an amber oil. Yield: 94.6% of theory. Analysis: calculated for Cl—22.27%; found—22.02%.

EXAMPLE IV 1-(3,4-Dichlorophenyl)-3-(3-Dibutylaminopropyl) Urea

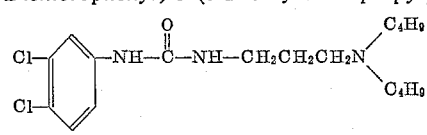

The procedure of Example I is repeated except 18.6 g. (0.1 mole) of N,N-dibutylpropylenediamine are used and 1-(3,4-dichlorophenyl)-3-(3-dibutylaminopropyl) urea is obtained as an amber syrup. Yield: 95.3% of theory. Analysis: calculated for Cl—18.94%; found 18.94%.

EXAMPLE V 1-(3,4-Dichlorophenyl)-3-(3-Dimethylaminopropyl) Urea

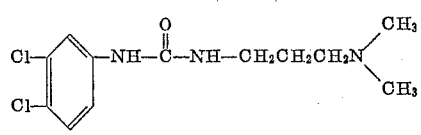

The procedure of Example I is repeated except 10.2 g. (0.1 mole) of N,N-dimethylpropylenediamine are used and 1-(3,4-dichlorophenyl)-3-(3-dimethylaminopropyl) urea is obtained as white granules having a M.P. of 114.9-115.6° C. Yield: 96.5% of theory. Analysis: calculated for Cl—24.45%; found—24.50%.

EXAMPLE VI 1-(3,4-Dichlorophenyl)-3-Dioctylaminomethyl Urea

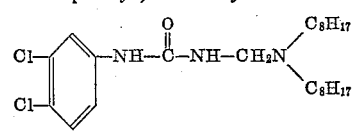

The procedure of Example I is repeated except 27.0 g. (0.1 mole) of N,N-dioctylmethylenediamine are used and 1-(3,4-dichlorophenyl)-3-dioctylaminomethyl urea is obtained in good yield as a yellow oil.

EXAMPLE VII 1-(3,4-Dichlorophenyl)-3-(3-Dihexylaminopropyl) Thiourea

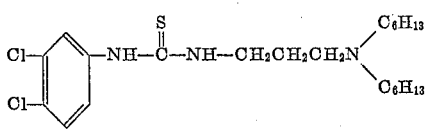

The procedure of Example I is repeated except the reactants are 20 g. (0.1 mole) of 3,4-dichlorophenylisothiocyanate and 24.2 g. (0.1 mole) of N,N-dihexylpropylenediamine. There is obtained a good yield of 1-(3,4-dichlorophenyl)-3-(3-dihexylaminopropyl) thiourea as a viscous yellow oil.

EXAMPLE VIII

1-(3,4-Dichlorophenyl)-3-(2-Diethylaminoethyl) Thiourea

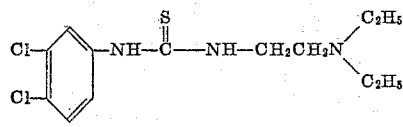

The procedure of Example I is repeated except 20.4 g. (0.1 mole) of 3,4-dichlorophenylisothiocyanate are substituted for the 3,4-dichlorophenylisocyanate and 1-(3,4-dichlorophenyl)-3-(2-diethylaminoethyl) 2-thiourea is obtained in good yield as a yellow oil.

It is to be understood that the foregoing examples are merely representative and that additional compounds may be readily prepared by reacting either a 3,4-dichlorophenylisocyanate or 3,4-dichlorophenylisothiocyanate with the appropriate N,N-dialkylalkylenediamine such as:

1-(3,4-dichlorophenyl)-3-(dibutylaminomethyl) urea,
1-(3,4-dibromophenyl)-3-(diheptylaminoethyl) urea,
1-(3,4-dichlorophenyl)-3-(dipropylaminopropyl) thiourea,
1-(3,4-dibromophenyl)-3-(dibutylaminomethyl) thiourea,
1-(3,4-dichlorophenyl)-3-(diamylaminomethyl) urea,
1-(3,4-dibromophenyl)-3-(diethylaminoethyl) thiourea,
1-(3,4-dichlorophenyl)-3-(dihexylaminoethyl) thiourea,
1-(3,4-dibromophenyl)-3-(dimethylaminoethyl) urea,
1-(3,4-dichlorophenyl)-3-(diheptylaminomethyl) urea,
1-(3,4-dichlorophenyl)-3-(dibutylaminoethyl) thiourea, and the like.

Although the compounds of this invention contemplate a dialkylamino group containing up to 8 carbon atoms, the preferred group includes only those dialkylamino groups having 1 to 4 carbon atoms as illustrated by Examples I–IV and VII above.

The new compounds of this invention have been found to exhibit outstanding bacteriostatic or antiseptic properties as evidenced by Table I below which sets forth the ability of typical compounds of this invention to inhibit the multiplication of *Micrococcus pyogenes* var. *aureus* (MPA). Tenfold serial dilutions of each of the compounds tested ranging from 1:1000 to 1:10 million were prepared in a nutrient sterilized agar. The agar in each case was then poured into a petri dish allowed to harden, and then incubated with a standard culture of MPA. The inoculation in each instance was for 48 hours at 37° C. The extent of growth is set forth in the table below:

TABLE I

| Compound | Concentration, one part per— | | | | |
|---|---|---|---|---|---|
| | 1T | 10T | 100T | 1M | 10M |
| 1-(3,4-dichlorophenyl)-3-(2-diethyl aminoethyl) urea | − | − | − | − | + |
| 1-(3,4-dichlorophenyl)-3-(3-diethyl aminopropyl) urea | − | − | − | − | + |
| 1-(3,4-dichlorophenyl)-3-(3-dibutyl aminopropyl) urea | − | − | − | + | |
| 1-(3,4-dichlorophenyl)-3-(3-dimethyl aminopropyl) urea | − | − | − | − | + |

Legend: T—thousand, M—million, − no growth, + growth.

In view of the strong bactericidal properties exhibited by these new compounds they may be effectively used wherever a bactericidal action is desired. Accordingly the compounds of this invention may be formulated with other compositions such as soaps, detergents, cosmetic preparations, tooth pastes, mouth lotions, and the like. The compounds of this invention may also be prepared in the form of solutions and dispersions thereof for use on the human skin and for treatment of fabrics, plastics, wooden articles, and metallic materials or wherever one seeks to prevent bacterial growth. Moreover, it is evident that due to their high bactericidal activity, the new compounds of this invention will prove effective in dispersions or solutions containing as little as 0.01% to 0.001%. From a practical standpoint concentrates containing up to 100% of the new compounds may be prepared such that the user by merely mixing the concentrate with an appropriate diluent or solvent will be able to prepare an efficient bactericidal solution or dispersion of these new compounds.

The above description and examples are intended to be illustrative only. Any modification thereof which conforms to the spirit of the invention is considered to be within the scope of the claim.

What is claimed is:

1. A compound of the formula

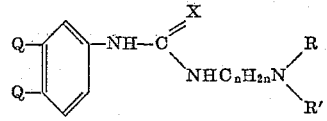

where Q is a halogen selected from the group consisting of chlorine and bromine, X is a member selected from the group consisting of oxygen and sulfur, R is alkyl having from 1 to 8 carbon atoms, R' is alkyl having from 1 to 8 carbon atoms, and $n$ is an integer from 1 to 3.

2. A compound of the formula

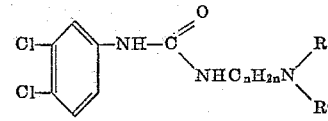

where R is alkyl having from 1 to 4 carbon atoms, R' is alkyl having from 1 to 4 carbon atoms, and $n$ is an integer from 1 to 3.

3. A compound of the formula

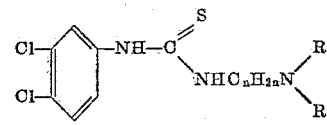

where R is alkyl having from 1 to 4 carbon atoms, R' is alkyl having from 1 to 4 carbon atoms, and $n$ is an integer from 1 to 3.

4. 1-(3,4-dichlorophenyl)-3-(2-diethylaminoethyl) urea.
5. 1-(3,4-dichlorophenyl) - 3 - (3 - diethylaminopropyl) urea.
6. 1-(3,4-dichlorophenyl) - 3 - (3-dibutylaminopropyl) urea.
7. 1-(3,4-dichlorophenyl) - 3 - (3-dimethylaminopropyl) urea.
8. 1-(3,4-dichlorophenyl)-3-(2-diethylaminoethyl) thiourea.

References Cited in the file of this patent

UNITED STATES PATENTS 2,673,878 Cusic _____ Mar. 30, 1954
2,826,611 Fischback et al. _____ Mar. 11, 1958

OTHER REFERENCES

Wenker: J. Am. Chem. Soc., vol. 60, pages 158–9 (1938).
Buck et al.: J. Am. Chem. Soc., vol. 64, pages 2231–34 (1942).
Compaigne et al.: Chemical Abstracts, vol. 7, pages 19–23 (1953).
Compaigne et al.: Chemical Abstracts, vol. 48, pages 11,320–11,321 (1954).